United States Patent [19]

Thorne

[11] 4,417,122

[45] Nov. 22, 1983

[54] RESISTANCE WELDING SYSTEM FOR PROJECTION WELDING

[75] Inventor: J. Paul Thorne, Bay City, Mich.

[73] Assignee: Newcor, Inc., Bay City, Mich.

[21] Appl. No.: 288,424

[22] Filed: Jul. 30, 1981

[51] Int. Cl.$^3$ .......................... B23K 9/09; B23K 11/14
[52] U.S. Cl. .................................... 219/108; 219/93; 219/116; 219/115
[58] Field of Search ................. 219/108, 93, 111, 114, 219/115, 116

[56] References Cited

U.S. PATENT DOCUMENTS

| | | | |
|---|---|---|---|
| 2,255,652 | 9/1941 | Dawson | 219/114 |
| 3,398,255 | 8/1968 | Aldenhoff | 219/116 |
| 3,445,620 | 5/1969 | Littwin | 219/108 |
| 3,632,958 | 1/1972 | Width | 219/120 |
| 4,282,417 | 8/1981 | Jurek | 219/116 |

FOREIGN PATENT DOCUMENTS 1207696  10/1970  United Kingdom ................ 219/116

*Primary Examiner*—B. A. Reynolds
*Assistant Examiner*—Teresa J. Walberg
*Attorney, Agent, or Firm*—Flynn, Thiel, Boutell & Tanis

[57] ABSTRACT

A resistance welding system having a low-inertia movable welding head coupled to a stationary welding transformer which is of low mutual reactance. Through an appropriate timing circuit and control, a high-energy pulse of current, of very short time duration, is transmitted through the welding transformer to the movable welding head. The welding head, which contacts a projection on overlapping components, effects a rapid welding of the components, and the welding head rapidly follows up the melting of the projection due to its low inertia.

5 Claims, 5 Drawing Figures

RESISTANCE WELDING SYSTEM FOR PROJECTION WELDING

FIELD OF THE INVENTION

This invention relates to an improved resistance welding system for projection welding of thin laminae.

BACKGROUND OF THE INVENTION

The securing together of overlying light gauge metal sheets by means of spot or projection welding is well known. The use of projection welding, which is particularly desirable in many situations, involves the formation of a small raised projection or bead on one of the sheets. A movable weld electrode is pressed against the sheet carrying the projection to cause heating and hence melting of the projection, accompanied by continued pressing of the weld electrode against the sheet to thereby weldably connect the two sheets together. While this projection welding technique is extensively utilized, nevertheless its use in many situations has been prevented or limited in view of the marking or discoloration of the surface of the second sheet in the heat-affected area. Also, many light gauge metal sheets are coated, and most known projection welding techniques have undesirably disrupted or caused significant melting of the coating, such as when the sheets are galvanized or terneplated. Thus, projection welding is not always wholly satisfactory.

To effect projection welding of two overlying sheets, several known welding systems have been utilized for this purpose, which known systems have incorporated a series of capacitors for controlling flow of current to the primary winding of the welding transformer. These systems, commonly referred to as capacitor discharge, spike or ultra-pulse systems, have all utilized capacitors for this purpose. Such systems, however, for the most part have required costly power capacitors, very high voltages on the capacitors and welding transformers, and complex current controls. These overall systems have thus been extremely complex and expensive, and at the same time provide a potentially greater safety hazard in view of the high voltages generated within the systems by the capacitors.

In another known system for projection welding, which system is free of power capacitors, the projection welding is effected by conventional resistance welding techniques. In this apparatus, the welding current is applied to the workpiece over only a fraction of one current cycle so that rapid projection welding can be accomplished. However, because of the speed of welding, the movable welding head (and its associated electrode) must be rapidly moved in response to melting of the projection in order to maintain proper welding pressure between the overlapping sheets. To accomplish this with this known system, the movable welding head has an electromagnet associated therewith so as to create a strong magnetic force, which magnetic force is intermittent and is controlled and synchronized with the weld current so that the movable weld head will rapidly move and maintain proper contact pressure with the sheets to be joined as the projection collapses. This large magnetic force, which is necessary in order to overcome the inertia of the movable weld head, is provided and controlled by means of a second transformer and control provided solely for controlling the magnetic force. This system, due to the dual transformers and controls, is necessarily of substantial complexity and hence is of high cost. Such system, known as a magnetic force welder, has been commercially available for approximately 15 years, although to the best of my knowledge this system has had only limited commercial success.

While other and more conventional resistance welding systems have been utilized for projection welding of overlying sheets, these conventional resistance welding systems have necessarily been limited as to their possible applications, inasmuch as they have been discovered to cause discoloration and surface marking throughout the heat-affected zone, whereby the resulting part is unacceptable in many types of applications. With these conventional resistance welding systems, the main welding transformer is normally connected to the welding head, which movable head is large and has substantial inertia. Further, the secondary of the welding transformer normally has a low voltage and relatively low amperage welding current generated therein. Hence, the timing control for this type system normally causes the welding head to press against the overlying sheets over a substantial period of time, which period of time normally encompasses five to six complete current cycles. This long period of contact is necessary in order for the welding head, due to its high inertia, to respond to the melting of the projection and move so as to maintain pressing engagement with the sheets. In view of this rather long welding contact between the electrode and the sheets, the welding heat affects a substantial area, and hence often causes undesirable discoloration surface marking or melting of coatings.

Accordingly, this invention relates to an improved resistance welding system, specifically for projection welding of light gauge plates or sheets, which system overcomes the disadvantages associated with conventional known systems of the type described above.

More specifically, the improved resistance welding system of this invention incorporates therein a low-inertia movable welding head coupled to a stationary welding transformer which is of low mutual reactance. Through an appropriate and conventional timing circuit and control, a very high-energy pulse of current, of very short time duration, is transmitted through the welding transformer to the movable welding head. The welding head, which has been moved into contact with the sheet carrying the projection so as to activate the welding cycle, hence effects a very rapid and efficient welding of the overlapping sheets or plates, and the welding head rapidly follows up the melting of the projection or bead due to the low inertia of the movable welding head. The system thus provides a desirable weld nugget between the overlapping sheets or plates without creating any significant heat-affected zone, and without causing excessive discoloration or marking of the sheets. This improved system is able to provide for efficient and effective projection welds, while at the same time the system is of minimal cost and is structurally and mechanically simple and compact.

In the improved system of this invention, as briefly described above, the system is totally free of power capacitors, and hence eliminates the use of high voltages and accompanying complex controls required by conventional projection welding systems which rely upon capacitors for developing a current spike or impulse. Further, the improved system of this invention also utilizes only a single transformer, which transformer is only electrically interconnected to the movable welding head which itself is of low inertia, whereby the overall system is hence both structurally and functionally of much greater simplicity than the conventional magnetic force welding system.

The system of this invention is particularly desirable since, in conjunction with its structural and operational simplicity (such as the use of a single transformer in conjunction with a low-inertia movable welding head), it is able to efficiently projection weld two sheets while utilizing a high-energy current pulse of short time duration. Specifically, the welding current pulse occurs over only a small fraction of the total power line frequency cycle. For example, the weld current pulse will never exceed one-half of the power line frequency cycle, and preferably does not exceed one-fourth the power line frequency cycle. Since one 60 hertz current cycle is equal to 16.7 milliseconds, the weld current pulse in the system of this invention thus normally occurs over a time span of three to four milliseconds. Further, the current magnitude in this invention is in the order of five to six times the current magnitude in conventional resistance projection welding.

To provide the system of this invention with a current of magnitude sufficient to create the high-energy short-duration welding current pulse, the welding transformer is designed for low mutual reactance, and further when conventional 460 volt single phase 60 hertz power is supplied to the primary of the transformer, the secondary will have a higher voltage than that for more conventional welding equipment. This combination of low mutual reactance and high secondary voltage generates a steeply rising current of higher magnitude than on conventional equipment to weld the same material thicknesses. This low mutual reactance can be achieved utilizing techniques which are known in the transformer industry, such as by increasing the number of primary and secondary windings so as to minimize the thickness of the individual coils, and by eliminating coil taps on the end coils so that all of the coils can be effectively utilized.

A further advantageous feature of this improved resistance welding system is its capability of carrying out sequential welding operations using current pulses of alternate polarity. The control includes a pair of unidirectional switches which control the current supplied to the primary of the transformer, which switches operate in opposite directions and are alternately sequentially opened by a sequencing device so that sequential welding operations are automatically carried out utilizing high-energy current pulses of alternate polarity. This thus prevents saturation of the transformer core, thereby permitting repetitive and cyclic operations to be carried out at a rather rapid rate over long periods of use.

The system of this invention is thus highly desirable for resistance welding, specifically projection welding or spot welding, relatively light gauge components, such as thin metal components formed from sheets. This improved system has been discovered particularly desirable for use with components in the range of 0.020 to 0.050 inch for permitting fast and efficient projection welding without causing marking or discoloration of the components.

Other objects and purposes of the invention will be apparent to persons familiar with welding systems of this general type upon reading the following specification and inspecting the accompanying drawings.

Figure 1:
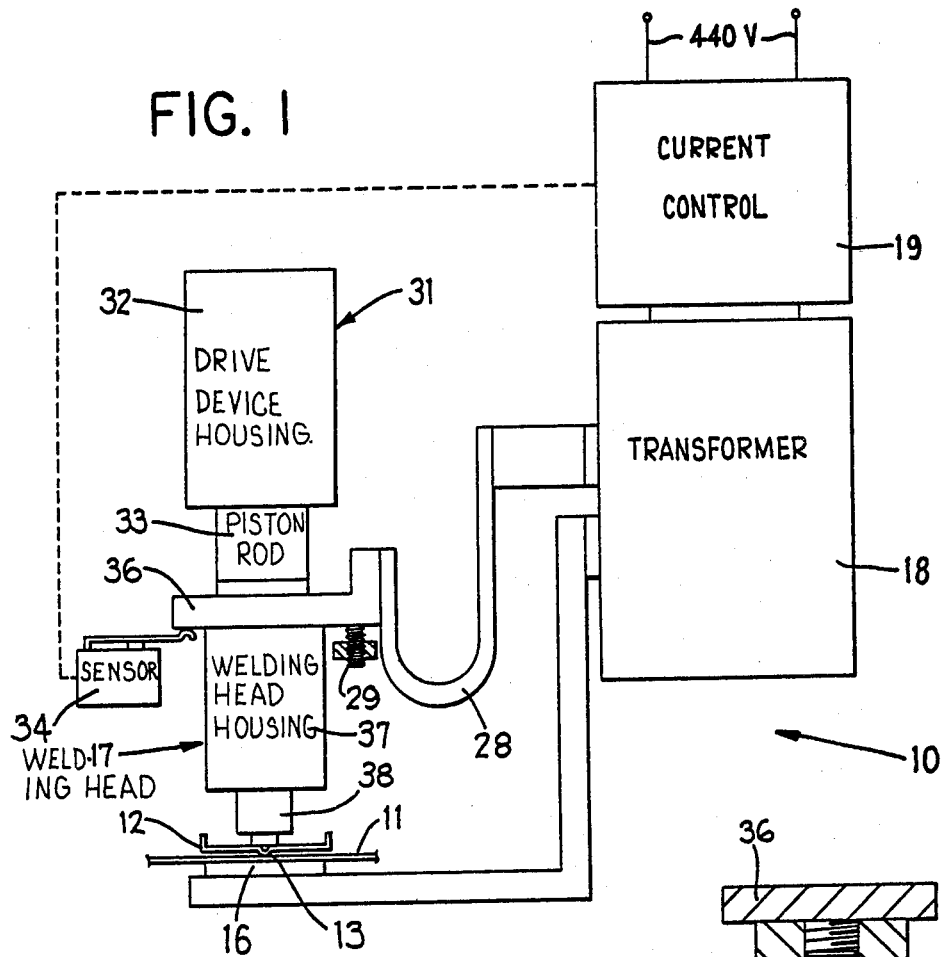
FIG. 1 diagrammatically illustrates the improved welding system of this invention.

Certain terminology will be used in the following description for convenience in reference only, and will not be limiting. For example, the words "rightwardly", "leftwardly", "upwardly" and "downwardly" will refer to directions in the drawings to which reference is made. The words "inwardly" and "outwardly" will refer to directions toward and away from the geometric center of the apparatus, and designated parts thereof. Said terminology will include the words specifically mentioned, derivatives thereof, and words of similar import.

DETAILED DESCRIPTION

FIG. 1 diagrammatically illustrates therein a resistance welding system or apparatus 10 according to this invention, which system is particularly desirable for projection welding of thin components, preferably components having a thickness in the range of 0.020 to 0.050 inch. The thin components or workpieces to be welded are illustrated at 11 and 12, and one of these components is provided with a bead or projection 13 which, when subjected to the welding current, is melted and compressed against the other component to create a localized weld between the components. Such projection welding is well known, so that further discussion and description as to the details thereof is believed unnecessary.

The system 10 includes a backup die 16 on which the components 11–12 are supported. A movable welding head 17 is disposed above the die 16 and is movable relative thereto so that the electrode on the welding head can engage the bead or projection 13 to effect the welding operation. This movable welding head 17 is electrically connected to a stationary transformer 18. The power supply to the transformer 18, and hence the welding current supplied therefrom to the welding head, is in turn controlled by a suitable control unit 19.

The transformer 18 has the primary coils 21 thereof connected to electrical leads or conductors 22 and 23, which conductors have a conventional 460 volt, single phase, 60 hertz power supply connected thereto. The secondary coils 24 of the transformer are in turn connected to conductors 26 and 27, the conductor 26 being connected to the backup die and the conductor 27 being connected to the movable welding head 17. These latter conductors 27 are flexible and in fact are incorporated within a flexible lamination 28 which is connected between the movable welding head 17 and the stationary transformer 18.

The transformer 18 is of low mutual reactance so that when the primary 21 is subjected to a voltage of approximately 460 volts, the secondary 24 will generate therein a voltage to generate the relatively high welding current germane to this system. This low mutual reactance, and hence high efficiency, of the transformer is achieved by maximizing the usage of the copper coils which define the primary and secondary. For example, the number of individual coils defining the primary and secondary are preferably increased from the number normally used so that the thickness of each coil is hence minimized, and the multiple taps conventionally utilized on transformer coils are also eliminated. These features, together with proper interleafing of mutual primary and secondary coils, hence permit the transformer to have the required low reactance. The design of a transformer having such a low reactance is known to those familiar with transformer technology, although such low reactance transformers are conventionally not utilized in resistance welding systems since such systems are more expensive to manufacture and the necessity or desirability of incorporating such transformers into resistance welding systems was not previously recognized.

To move the welding head 17 to initiate a welding operation, there is provided a suitable drive device 31, specifically a pneumatically actuated fluid pressure cylinder. This cylinder 31 is of conventional construction in that its housing 32 is stationarily mounted and a piston rod 33 linearly projects from the lower end thereof and is slidably reciprocal for controlling linear reciprocal movement of the welding head 17. The lower free end of piston rod 33 is suitably fixed to a head plate 36 which is associated with and mounts thereon the movable welding head 17, which head plate 36 also functions as the connector for the flexible lamination 28 and its associated conductors 27. This head plate 36 is disposed for activating a suitable sensor 34, such as a limit switch, when the welding head is moved downwardly into engagement with the sheet carrying the bead 13, which sensor 34 in turn transmits a signal to the control unit 19 for permitting the appropriate weld current pulse to be transmitted to the welding head.

Figure 2:
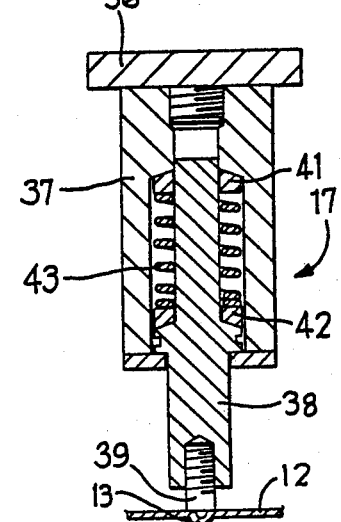
FIG. 2 is an enlarged central sectional view of the movable welding head.
Figure 3:
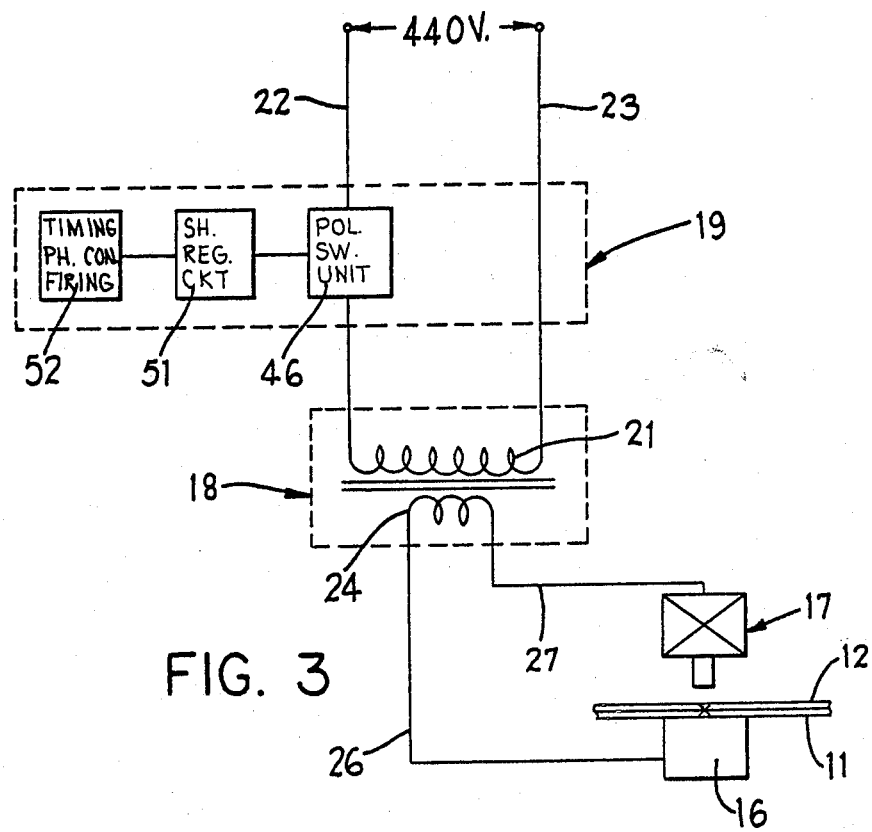
FIG. 3 diagrammatically illustrates the relationship between the control unit, transformer and welding head.
Figure 4:
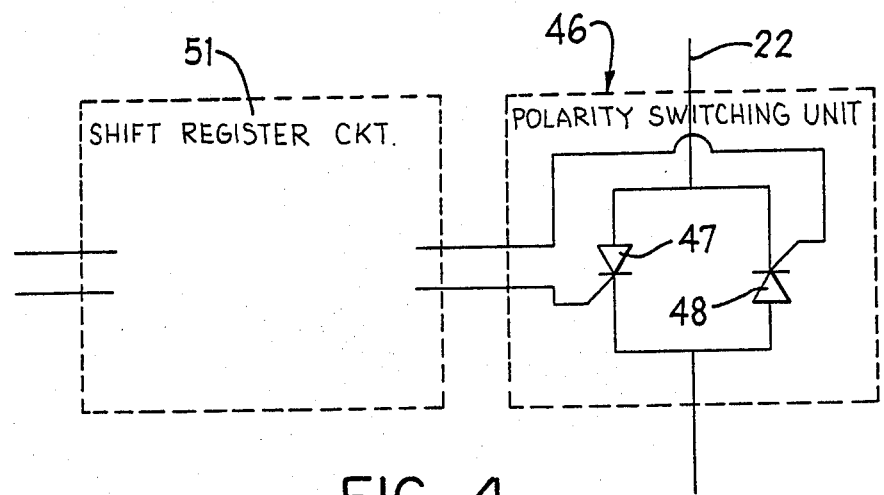
FIG. 4 illustrates the switching structure and the shift register circuitry for causing sequential welding operations to be of alternate polarity.

This movable welding head 17, as illustrated by FIG. 2, includes a cylindrical conductive housing 37 fixed to the head plate and linearly slidably supporting therein a low-mass plunger or holder 38. The latter, at its lower free end, mounts thereon an electrode 39 which contacts the sheet carrying the bead 13. A pair of split contact rings 41 and 42 are mounted within the cylindrical housing 37 and slidably engage the plunger 38 for permitting transmission of the weld current pulse from housing 37 through contact rings 41-42 into and through the plunger 38 to the electrode 39. A coil spring 43 is disposed within housing 37 in encircling relationship to plunger 38, which coil spring has the opposite ends thereof bearing against the split contact rings 41 and 42 so that, due to their tapered surfaces, they are maintained in intimate electrically conductive contact with the housing and plunger.

After the electrode 39 has been moved into engagement with the workpiece in which the projection 13 is incorporated by energization of the air cylinder 31, then the air cylinder and the housing 37 associated with the welding head comes against a fixed stop 29. When welding current is applied through electrode 39 onto the projection 13 so as to cause melting thereof, the collapse of the projection hence requires that the electrode 39 move rapidly downwardly so as to maintain proper welding engagement with the lower workpiece 11. This rapid downward movement of the electrode is caused by the urging of the spring 43 and, since only the plunger 38 and electrode 39 need be moved, which members themselves are extremely small and hence of extremely low inertia, this thus enables the electrode to properly and rapidly follow the movement of the melted projection so as to maintain adequate weld pressure even as the projection collapses, even though the complete weld operation requires only three to four milliseconds.

This movable welding head 17 is, by itself, known and reference is made specifically to U.S. Pat. No. 3,632,958. Further, other welding heads can be utilized so long as they possess a low-mass low-inertia electrode holder which is continuously biased for rapid follow-up movement when the projection collapses.

Considering now the control unit 19, same includes a polarity switching unit 46 associated with one of the supply conductors as connected to the primary of the transformer. This switching unit 46 includes therein two switches 47 and 48 connected in parallel, which switches are each capable of transmitting current therethrough solely in one direction, with the switches being oppositely oriented. These switches, which preferably comprise conventional SCR's, hence effectively control the flow of electrical energy to the primary of the transformer. For example, the switch 47, when triggered, will permit only a single pulse of positive polarity energy to be supplied to the transformer, whereas the triggering of the other switch 48 will permit only a single pulse of negative polarity energy to be transmitted to the transformer.

Control unit 19 also includes a shift register circuit 51 which functions as a flip-flop and which is of known electrical circuitry. This shift register circuit 51 records each welding cycle and hence causes a triggering signal to be alternately supplied to first the switch 47 and then the switch 48 so that sequential welding cycles are hence of alternate polarity, thereby avoiding saturation of the core within the transformer. This shift register circuit is well known and may be one of many known variations, such as two cross-connected NAND gates (i.e., a latch flip-flop) or a ratchet relay.

Control unit 19 also has a conventional timing, phase control and firing circuit 52 associated therewith for controlling the welding operation. Such circuitry is conventional and well known, and can incorporate many different variables as is well understood by those familiar with resistance welding equipment, so that detailed description thereof is believed unnecessary.

Figure 5:
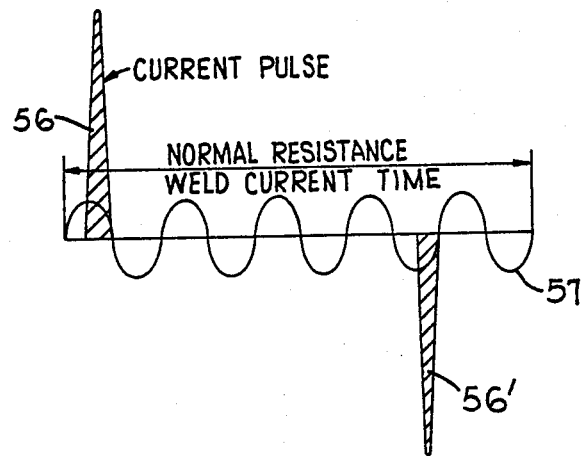
FIG. 5 diagrammatically illustrates a typical high-energy welding pulse as utilized in the system of this invention, in comparison to a conventional low-energy multiple-cycle welding pulse utilized in conventional resistance welding systems.

With the system 10 of this invention, the actual welding operation occurs by use of a short-duration high-energy current pulse, such as the pulse 56 illustrated in FIG. 5. This pulse is of single polarity, and hence is at its maximum no greater than one-half of a permissible current cycle. Preferably, by suitable adjustment of the timing circuit 52, the welding current is triggered to fire at a point in time which is in the neighborhood of the current peak, whereby a rather high amperage current is thus suddenly imposed on the electrode over only a very short duration, which duration is normally no more than one-quarter of the current cycle and in fact is generally somewhat less than this magnitude, preferably being of a duration between three and four milliseconds.

In contrast, conventional resistance welding equipment normally utilizes a much lower amperage welding current, such as indicated by the solid line sinusoidal current wave or cycle 57 in FIG. 5, and the actual welding time normally is of substantial length so as to encompass typically five to six complete cycles of current, whereby the actual welding time may typically be in the order of 80 to 100 milliseconds.

With the improved system of this invention, the firing and timing circuitry 52 will be activated in response to a signal received from the sensor 34 indicating that the electrode is in contact with the sheet carrying the weld projection. The timing circuit 52 will thus emit a single firing signal which, due to the shift register circuitry 51, will be transmitted to one of the switches, such as switch 47, which switch will be activated so that a single high energy pulse of only one polarity (such as positive) will be transmitted to the transformer, which in turn will supply a corresponding high energy pulse 56 from the secondary to the electrode. This welding pulse will be of short duration, such as three or four milliseconds. During this short duration, the projection will collapse and the low inertia of the plunger 38 and electrode 39 will enable it, due to the urging of spring 43, to rapidly follow up the collapse of the projection so as to maintain proper welding pressure against the workpieces at all times.

When the electrode has been repositioned so as to be in engagement with a further projection, then the sensor 34 will again activate the control unit 19 so as to permit the next welding operation to be carried out. At this time, however, the shift register 51 will now direct the single firing signal to the other switch 48 which acts in the opposite direction, thereby opening this switch 48 so that a single pulse of energy having the opposite polarity (that is, negative) is transmitted to the transformer, which in turn transmits a high-energy welding pulse of short duration to the electrode, this latter pulse being diagrammatically designated at 56' in FIG. 5. In this manner, alternate welding cycles will automatically be of opposite polarity whereby magnetic saturation of the transformer core is effectively prevented.

Hence, the system 10 of this invention thus does not rely upon capacitors for creating the welding current spike or pulse, but instead relies solely on a source of 460 volt power which, through appropriate timing circuitry, is supplied in the form of extremely short-duration energy pulses to the primary of the transformer, which in turn through its secondary supplies extremely short-duration high-energy pulses to the welding head electrode. This is accomplished utilizing solely a single transformer of low mutual reactance so that the secondary has generated therein a current of substantially higher amperage, and of substantially higher voltage, than that normally utilized in resistance welding equipment. The welding head is of low-inertia type, that is only the welding electrode and its small mounting plunger are moved so as to follow up the collapse of the projection during the short-duration welding cycle, whereby the electrode can maintain adequate welding pressure even though the welding cycle is of this very short duration. This resulting system is thus both structurally and operationally simple, and hence is relatively inexpensive in comparison to other known equipment developed for this purpose. The equipment is also of high reliability, and is particularly suited for repetitive welding cycles at a rather rapid rate since the switching of the current polarity upon alternate weld cycles thus prevents saturation of the transformer core so as to insure proper operation of the system at a rather rapid rate over a large number of operational cycles.

Typical welding parameters for two sheets of 0.025 inch steel might be 5,000 to 6,000 amperes welding current with the weld time of five to six cycles for conventional equipment, in comparison to 25,000 amperes of weld current with a weld time of three to four milliseconds for the present invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed as defined as follows:

1. In a resistance welding apparatus for welding together two platelike workpieces and comprising:
   a transformer unit having cooperating primary and secondary windings, electrical conductor means for connecting said primary winding to a source of alternating current electrical energy, a welding head connected to the secondary winding of said transformer unit, and control means including switch means interposed in said conductor means for permitting only a single pulse of electrical energy of duration less than one cycle of said alternating current source to be supplied therethrough to the primary winding of said transformer unit,
   the improvement comprising means for projection welding of first and second metal sheets each having a thickness in the range of about 0.020 to 0.050 inch with the welding being at a beadlike projection in the first sheet in contact with the second sheet, including a stationary conductive back-up die supporting said second sheet, a welding head assembly which incorporates and supports said welding head for axial reciprocation with respect to said transformer unit, said welding head comprising an axially reciprocable low-inertia electrode and holder positioned for pressing engagement of the electrode with the first sheet directly at the projection, means continuously biasing the low-inertia electrode holder toward the first sheet for rapid follow-up movement by the electrode holder of the collapsing projection to continue pressing of the first and second sheets together during a weld, said transformer unit being a single welding transformer of low mutual reactance and high secondary voltage relative to conventional multicycle resistance welding transformers, the primary of the welding transformer being connected to a conventional power line source of about 460 volt 60 hertz electrical energy through said switch means for energization by a single unipolarity pulse of the approximately 460 volt 60 hertz power line electrical energy, means triggering said switch means in each welding cycle for outputting at said secondary only a single unipolarity pulse of approximately 3 to 4 millisecond duration and of high current magnitude and fast rise time relative to conventional multicycle resistance welding transformers, said welding transformer being stationary and disposed adjacent said welding head assembly, the secondary of said stationary transformer being electrically connected to said reciprocating holder by an intermediate flexible electrical conductor and being electrically connected to and fixed with respect to said conductive back-up die, said welding head assembly being a conventional one of the kind including a drive device reciprocally driving the welding head between retracted sheet releasing and extended sheet engaging positions and in which the movable welding head includes an electrically conductive housing connected to and driven by the drive device with said holder being movably supported on said housing and in electrically conductive contact therewith.

2. The apparatus of claim 1, wherein the single weld current pulse has a magnitude of about 25,000 amperes for steel sheets of about 0.025 inch thickness.

3. The apparatus of claim 1, wherein said low mutual reactance of said welding transformer is achieved, in contrast to conventional resistance welding transformer practice, by an increased number of turns of minimized thickness in both the primary and secondary windings and elimination of coil taps.

4. An apparatus according to claim 1, wherein said switch means includes first and second switches associated with said conductor means and connected in parallel therewith, said first and second switches each being unidirectional with respect to flow of electrical energy therethrough and being connected in opposite directions, and sequencing means associated with said first and second switches for alternately activating same so that sequential welding cycles are carried out by high-energy pulses of alternate polarity.

5. A resistance welding process for projection welding of two sheets, comprising the steps of:

provided first and second metal sheets each having a thickness in the range of 0.020 to 0.050 inch, with the first sheet having a beadlike projection formed therein;

positioning said first and second sheets adjacent one another so that the projection on the first sheet is in contact with the second sheet;

providing a welding head assembly which reciprocably supports thereon a low-inertia electrode and holder;

positioning the welding head assembly such that the electrode is in pressing engagement with the first sheet directly adjacent the projection;

providing a single stationary weld transformer of low mutual reactance and high secondary voltage;

electrically coupling the secondary of the transformer to the welding head assembly through an intermediate flexible electrical conductor;

supplying standard power line 460 volt 60 hertz electrical energy to the primary of said transformer through a switching device capable of transmitting therethrough solely a single unipolarity pulse of 460 volt electrical energy;

in each welding cycle, producing a single unipolarity current pulse of very high amperage and of approximately 3 to 4 millisecond duration through said secondary winding and electrode;

continuously biasing said low inertia reciprocating holder toward and therewith continually axially pressing said electrode against the first sheet as the energy pulse is transmitted to the electrode and therewith closely axially advancing the electrode so as to continuously follow and press against the collapsing projection area of the sheets so as to effect a resistance weld between the sheets; and reversing the switching device after each welding cycle for transmitting therethrough a single short duration energy pulse of opposite polarity so that sequential welding cycles are carried out by short duration pulses of opposite polarity.

* * * * *